Z. T. BLACKMAN.
COMBINATION HOE AND SPADE.
APPLICATION FILED FEB. 9, 1918.
1,344,256.
Patented June 22, 1920.
Fig. 1.
Fig. 2.
Fig. 3.
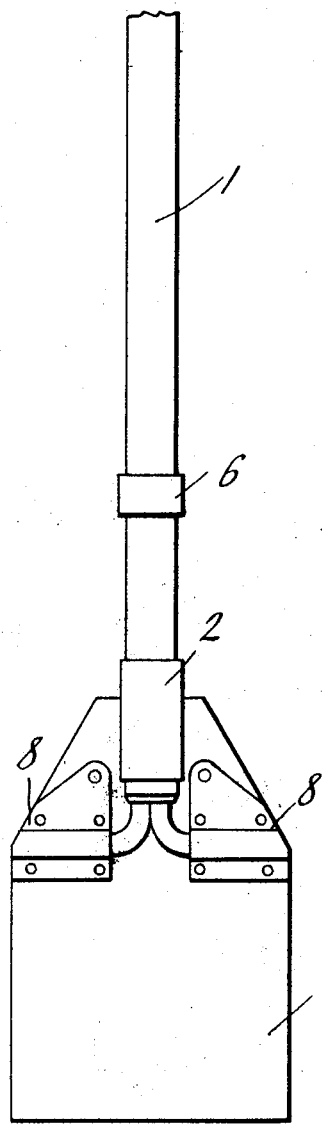
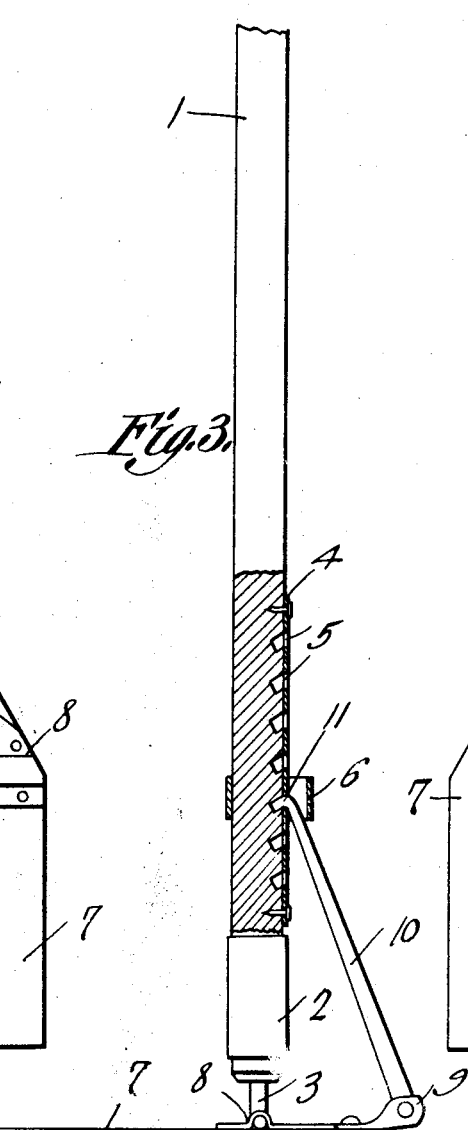
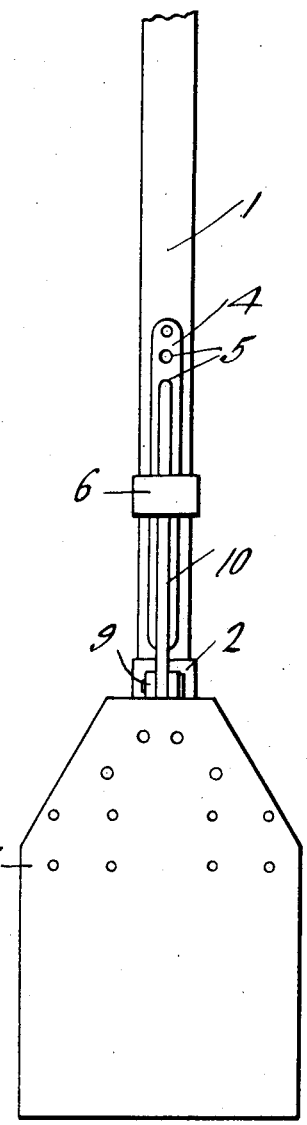
Z. T. Blackman
Inventor
by C. A. Snow & Co.
Attorneys
Witnesses

UNITED STATES PATENT OFFICE.

ZACHARY T. BLACKMAN, OF LONG BEACH, MISSISSIPPI.

COMBINATION HOE AND SPADE.

1,344,256.  Specification of Letters Patent.  Patented June 22, 1920.

Application filed February 9, 1918. Serial No. 216,266.

*To all whom it may concern:*

Be it known that I, ZACHARY T. BLACKMAN, a citizen of the United States, residing at Long Beach, in the county of Harrison and State of Mississippi, have invented a new and useful Combination Hoe and Spade, of which the following is a specification.

The subject of this invention is a combination hoe and spade, and the objects of the invention are first, to provide a handle with a pivoted blade which may be quickly and easily swung to various positions to present a spade or a hoe, second to provide a combination tool with means for setting the tool in various positions and means for locking the tool in its positions, third, to provide a simple and efficient combination spade and tool.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawing, wherein:

Figure 1 is a rear elevation of the device.

Fig. 2 is a front elevation of the same.

Fig. 3 is a side elevation of the device set as a hoe, and a portion in section to show the adjusting means.

Referring to said drawing by numerals of reference:

The tool consists of a handle 1, on the end of which is secured a ferrule 2 and in the end of which is secured a T shaped member 3. A plate 4 is secured to the handle adjacent the ferrule and extends for a short distance longitudinally of the handle. This plate 4 is provided with a series of apertures 5 for a purpose to be explained. A collar or band 6 encircles the handle 1 and slides thereon.

A blade 7 is pivotally mounted on the T member 3 in any suitable manner as by means of the plates 8 which are secured to the blade 7 and are struck up, as shown, to receive the cross arms of the T member 3.

Spaced lugs 9 are secured to the upper edge of the blade 7 and between these lugs is pivotally hung a rod 10, the free end of which is angled, as seen at 11, Fig. 3, to selectively enter the apertures 5. The collar 6 is adapted to encircle the rod 10 and the handle to firmly bind the bent end 11 in place in an aperture 5.

It is thought that the operation of the device will be readily understood from the foregoing. It will be noted that the hoe may be set at any of several angles to suit the convenience of the one using the implement.

Having thus described the invention, what is claimed as new and sought by Letters Patent, is:

The combination with a handle and a T-shaped member extending from one end of the handle, a wear plate extending longitudinally along the handle, and a longitudinal series of recesses within the handle and opening through the plate, said recesses being extended obliquely into the handle toward that end from which the T-shaped member extends, of a blade, face plates thereon forming bearings for the reception of opposed arms of the T-shaped member, a rod pivotally connected to the blade at one end thereof, said rod having its free end portion bent at an angle for insertion through the wear plate and into any one of the recesses in the handle, and a collar slidable upon the handle for engaging the arms to hold the bent end thereof seated within a notch.

In testimony that I claim the foregoing as my own, I have hereto affixed my signature in the presence of two witnesses.

ZACHARY T. BLACKMAN.

Witnesses:
 W. H. MAYBIN,
 D. H. KING.